United States Patent
Itoh et al.

(10) Patent No.: US 6,795,912 B1
(45) Date of Patent: Sep. 21, 2004

(54) METHOD FOR CONTROLLING COMPUTER, COMPUTER, AND STORAGE MEDIUM

(75) Inventors: Hiroshi Itoh, Sagamihara (JP); Naotaka Kato, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/671,499

(22) Filed: Sep. 27, 2000

(30) Foreign Application Priority Data

Sep. 28, 1999  (JP) .......................................... 11-273860

(51) Int. Cl.⁷ .......................... G06F 15/177; G06F 9/00
(52) U.S. Cl. ........................... 713/2; 713/100; 709/221
(58) Field of Search .............................. 713/2, 1, 150, 713/100; 709/221, 222, 320

(56) References Cited

U.S. PATENT DOCUMENTS

| | | | | |
|---|---|---|---|---|
| 4,675,814 A | * | 6/1987 | Murai et al. | 717/162 |
| 4,799,145 A | * | 1/1989 | Goss et al. | 713/1 |
| 5,715,462 A | * | 2/1998 | Iwamoto et al. | 717/173 |
| 6,128,734 A | * | 10/2000 | Gross et al. | 713/100 |
| 6,327,653 B1 | * | 12/2001 | Lee | 713/100 |

FOREIGN PATENT DOCUMENTS

| | | | | |
|---|---|---|---|---|
| JP | 03103931 A | * | 4/1991 | G06F/9/46 |
| JP | 06004310 A | * | 1/1994 | G06F/9/46 |

OTHER PUBLICATIONS

IBM, Automatic Self–Optimization of Application Programs under Multi–Operating System environement, Jun. 1, 1994, vol. 37, Issue 6A, pp. 413–414.*

* cited by examiner

*Primary Examiner*—Thomas Lee
*Assistant Examiner*—Suresh K Suryawanshi
(74) *Attorney, Agent, or Firm*—William A. Kinnaman, Jr.

(57) ABSTRACT

To provide a general-purpose method of making it possible to easily realize the switching of an OS, which is booted on a computer, among OSs, the present invention downloads information for booting a second OS in a state of a first OS operating on the computer with access to a homepage, reception of e-mail, or the like (130), starts a device driver after password verification, and requests the hook of OS termination (134 to 138). The device driver performs the processing of hooking the OS termination according to the request, and suspends the processing after loading a boot image file or the like, which are downloaded, into a main storage unit (114–148). When the OS is terminated, the device driver restarts the processing and starts a patch program after changing a processor mode (150 and 152). Owing to this, after various types of preprocessing are performed, the second OS is booted by using the boot image file loaded into the main storage unit.

17 Claims, 12 Drawing Sheets

METHOD FOR CONTROLLING COMPUTER, COMPUTER, AND STORAGE MEDIUM

BACKGROUND OF THE INVENTION

1. Field of the Invention

The present invention relates to a method for controlling a computer, a computer, and a storage medium, and in particular, to a method for controlling a computer of booting a second OS different from a first OS that is usually booted on a computer, a computer where the above-described method is applied, and a storage medium where a program for realizing the above-described method by a computer is recorded.

2. Description of the Related Art

As operating systems for computers (hereinafter, OS(s)), there are various types of OSs, and each OS has characteristic different from each other. For this reason, even if a specific OS is installed so that the OS may be fixedly booted, it may become necessary to boot another OS. For example, it is desirable that an application program updating firmware such as a BIOS is executed under an environment where an OS (e.g., DOS (Disk Operating System)) operates, where only a single task is executable, rather than an environment where an OS having a function of executing a plurality of tasks in parallel (e.g., Microsoft Windows) operates.

As a method for booting an OS (hereinafter, this is called a second OS conveniently) which is different from an OS (hereinafter, this is called a first OS conveniently) usually booted when a computer is booted, a method is known. The method in which the second OS is booted by storing a boot image (a series of instruction codes which is read and executed in turn from a head thereof so that the OS is booted) in a floppy disk (FD), which is used for booting the second OS, setting the floppy disk in a floppy disk drive (FDD), and booting a computer system.

In addition, as another method, a technology is also known, the technology which is such that firmware built in a network adapter connected to a computer communicates with a server via a network without using function of an OS to acquire information, which is used for booting the second OS, from the server, and makes the second OS boot remotely in the computer.

Nevertheless, there is such a disadvantage that the method of setting an FD in an FDD cannot be applied to a computer not having the FDD. In addition, work of creating an FD for booting the second OS and of setting the created FD in the FDD is complicated, and the more the number of computers to boot increase, the more the work to create the FDD becomes complicated.

In addition, in the method that firmware built in a network adapter communicates with a server and acquires information from the server, communication between the firmware and server is realized with a specific bootstrap protocol (e.g., a bootstrap protocol or the like in an RFC951 (Internet Request For Comments 951) that is defined by IETF (Internet Engineering Task Force)). Therefore, this method has such a problem that the server must support the specific protocol and acquisition of the information used for booting an OS is limited, due to influences of network components such as a firewall and a router, and hence general versatility is poor.

Furthermore, as still another method of booting a second OS, it is also conceivable selectively to boot two or more kinds of OSs by dividing a storage space of a hard disk or the like into a plurality of partitions, storing boot images used for booting OSs different from each other in respective partitions, and booting a computer after rewriting a master boot record determining which partition is accessed to boot an OS when the computer is booted.

Nevertheless, this method has problems to effectively use the storage space of the hard disk since one of the plurality of partitions is occupied to boot the second OS even if a utilization rate of the second OS is low, since the partition including the boot image for booting the second OS resides in the storage space of the hard disk, and to easily create a partition for the second OS after installing a first OS.

In addition, in the method of storing the boot image of a second OS in a hard disk (similar to the method of storing the boot image in an FD), it is common to also store an application program or the like, which are to be executed under the control of the second OS. Nevertheless, for example, for update of firmware that is an example of processing to be executed by switching an OS, it is necessary to acquire a latest application program for updating the firmware to the latest firmware after version-up. Therefore, there are hardly advantages even if such an application program resides in the hard disk. In addition, although it is conceivable to delete the application program from the hard disk after executing the application program, this also has such a problem that deletion work is complicated. Furthermore, generally speaking, if file systems of the first and second OSs are different from each other, it is difficult to perform the update and deletion of an application on the second OS from an application on the first OS.

The present invention is conducted in consideration of the above facts, and its object is to acquire a method for controlling a computer that can easily realize the switching between OSs that are booted in a computer, and is excellent in general versatility.

Furthermore, anther object is to provide a method for switching an OS, which is booted, without modifying hardware and firmware of an existing computer.

Moreover, still another object of the present invention is to acquire a computer and a storage medium that can easily switch an OS to be booted.

SUMMARY OF THE INVENTION

A method for controlling a computer according to the steps of acquiring information, being used for booting a second OS and being different from a first OS, under control of the first OS in a state where the first OS is operating on the computer; writing the acquired information, in a main storage unit of the computer; and booting the second OS on the computer with the information written in the main storage unit without deleting the information written in the main storage unit, when termination of the first OS is detected.

In addition, for example, the information for booting the second OS can be configured to include a boot image file (a file configured with data showing a boot image) for booting the second OS. Furthermore, the information for booting the second OS can also include a program (this program can be fixedly stored in the computer) for writing the information, which is used for booting the second OS, in a main storage unit of the computer, and a program to be executed after booting the second OS.

In addition, concretely, it is possible to acquire the information, which is used for booting the second OS, for example, by receiving the information as a file from the outside of the computer via a communication line under the control of the first OS. In this case, since the communication with a server is performed under the control of the first OS, it is possible to easily acquire the information, which is used for booting the second OS, for example, in a general purpose communication mode which can be used under the control of the first OS, without depending on a specific protocol for remotely booting the second OS (e.g., to download the information as a file from a Web server (network drive) by a Web browser, to receive the information as an attachment to e-mail, or the like).

Furthermore, in the case where the information that is used for booting the second OS is acquired by receiving the information as a file from the outside via a communication line, the information acquired can be directly stored in the main storage unit of the computer that comprises a memory or the like. Nevertheless, so long as the information is temporarily stored in the secondary storage unit of the computer that comprises a hard disk or the like, it is possible to prevent a memory area of the main storage unit from being oppressed in a period when the information acquired is written in the main storage unit thereafter.

Moreover, in the case where the information that is used for booting the second OS is written beforehand in the secondary storage unit of the computer, it can be performed to acquire the information, which is used for booting the second OS, by reading the information from the secondary storage unit under the control of the first OS. In this mode, it can be performed to acquire the information, which is used for booting the second OS and for being written beforehand in the secondary storage unit, by receiving the information from the outside via a communication line. In addition, if a drive of an information-storage medium such as an FD is provided in the computer, it is possible to acquire the information by reading the information from the information-storage medium where the information is written.

Furthermore, in the present invention, if the information acquired is written in the main storage unit of the computer and the termination of the first OS is detected, the second OS is booted in the computer with the information written in the main storage unit without deleting the information written in the main storage unit. Although information stored in the main storage unit is deleted in the case where the computer is rebooted, in the present invention, the information written in the main storage unit is not deleted. Hence, it is possible to make the second OS with the information written in the main storage unit.

In addition, the information written in the main storage unit is deleted when the computer is next rebooted. Therefore, in order to boot the second OS, a storage area of the secondary storage unit is never oppressed, for example, by dividing the storage area of the secondary storage unit into a plurality of partitions and fixedly storing the information in specific partitions, and it is not necessary to perform complicated work such as rewriting a master boot record or activating the computer with setting an FD. Furthermore, it is possible to perform booting the second OS even if an FDD is not provided in the computer.

Therefore, according to the present invention, it is possible to easily switch from the first OS to the second OS that is different from the first OS, and is also excellent in general versatility since it is possible to implement the present invention without depending on a specific protocol for booting the second OS remotely.

By the way, if a boot image file of the second OS is included in the information for booting the second OS, booting the second OS is realized by executing a bootstrap code of firmware accessing an area of the main storage unit, where the boot image file of the second OS is written in the main storage unit after the first OS is terminated.

In addition, it is possible to realize that the area of the main storage unit, where the boot image file of the second OS is written, is made accessed by the bootstrap code of the firmware, by hooking secondary storage unit I/O service code (changing a jump destination by rewriting a table in an indirect jump of jumping to the jump destination registered in the table with referring to the table where the jump destination is registered). Owing to this, it is possible to boot the second OS without changing the bootstrap code of the firmware.

Moreover, it is different every OS what is the use of each memory area of the main storage unit. For this reason, in the present invention, for example, at the timing before detecting the termination of the first OS, the information for booting the second OS is temporarily written in an area, which is not overwritten under the control of the first OS, among memory areas of the main storage unit. For example, at the timing after detecting the termination of the first OS and before booting the second OS, it is preferable to relocate part or all of the information written (information used in at least current or later processing) at least in an area, which is not overwritten by booting the second OS, within the memory areas of the main storage unit. By relocating the information as described above, it is possible to prevent the information, which is relocated, from being overwritten and broken by booting the second OS, and it is possible to normally boot the second OS.

In addition, the area where the information is relocated can be an area that is not overwritten by booting the second OS and is not also overwritten under the control of the second OS after booting the second OS among memory areas of the main storage unit. Alternately, if the information relocated is not used after booting the second OS, the information can also be relocated in an area that is not overwritten by booting the second OS and is overwritten under the control of the second OS after booting the second OS.

Furthermore, in the present invention, programs (processing) to be executed in a state where the second OS is operating after booting the second OS in a computer are, for example, a firmware update program, a program performing network boot needing a specific protocol, a setup program, a computer system diagnostic program, and a program whose operation is not guaranteed in a state where the first OS is operating or that performs processing not suitable to execution in the state.

Moreover, in the present invention, in the case where the first OS has functions such as an automatic program boot function, and an automatic log-on function, by using these functions, it is also possible to automatically and continuously make a series of processing from booting the first OS in a computer at least to booting the second OS in the computer (or a series of processing including the execution of processing to be executed after booting the second OS). Owing to this, it is possible to reduce user's work for booting the computer execute the series of processing.

In addition, the present invention is not limited to switching between two kinds of OSs, which are booted in a computer, but it is possible to boot an OS #3 in the computer by applying the present invention with booting an OS #2 a first OS according to the present invention to the computer in a state where the OS #2 is operating after booting the OS

2 in the computer by applying the present invention to the computer in a state where an OS #1 is operating. Therefore, by repeating the above procedure, it is possible to switch the OS, which is booted in the computer, among three or more kinds of OS.

Furthermore, it is also possible to realize the switching of the OS, which is booted in the computer, among three or more kinds of OSs, for example, by acquiring respectively the information, which is used for booting a plurality of OSs, which are different from each other, as the information for booting a second OS, which is different from a first OS, and booting one of the plurality of OSs, which is not executed yet, in the computer each time the termination of one of the plurality of OSs (termination of tie first OS or another OS) is detected.

Moreover, in the present invention, it is preferable to verify whether a user of the computer is an authorized user of the second OS before or after acquiring the information for booting the second OS. The verification of whether the user is an authorized user can be performed, for example, by prompting the user to input his/her password and checking the password, which is inputted, with a password registered beforehand. Owing to this, it is possible to prevent a person, who is not an authorized user, from acquiring the information for booting the second OS and booting the second OS in the computer, or from booting desired processing executed in a state where the second OS is operating.

In addition, in application programs on the second OS, programs that cannot operate depending on system configuration may be included. In such a case, it is possible to prevent a boot image of the second OS including application programs on the second OS from erroneously being booted and executed on a computer by prompting a user to input information relating to his/her system such as part of system configuration, or an ID number, or automatically acquiring the information from the system, and checking the information with the application programs on the second OS.

Furthermore, it is possible to prevent another person, who is not an authorized user, from invalidly using a computer under the second OS by booting the second OS after performing a protocol for verifying that the information for booting the second OS is not information invalidly tampered.

A computer according to an acquisition logic for acquiring information, which is used for booting a second OS and different from a first OS, under control of the first OS in a state where the first OS is operating on the computer; a write logic for writing the information, which is acquired by the acquisition logic, in a main storage unit of the computer; and a boot control logic for booting the second OS on the computer with the information written in the main storage unit without deleting the information written in the main storage unit by the write logic, when termination of the first OS is detected.

A storage medium recording a computer executable program, the program comprising the steps of acquiring information being used for booting a second OS and being different from a first OS, under control of the first OS in a state where the first OS is operating on the computer; writing the acquired information in a main storage unit of the computer; and booting the second OS on the computer with the information written in the main storage unit without deleting the information written in the main storage unit, when termination of the first OS is detected.

DESCRIPTION OF THE PREFERRED EMBODIMENT

Figure 1:
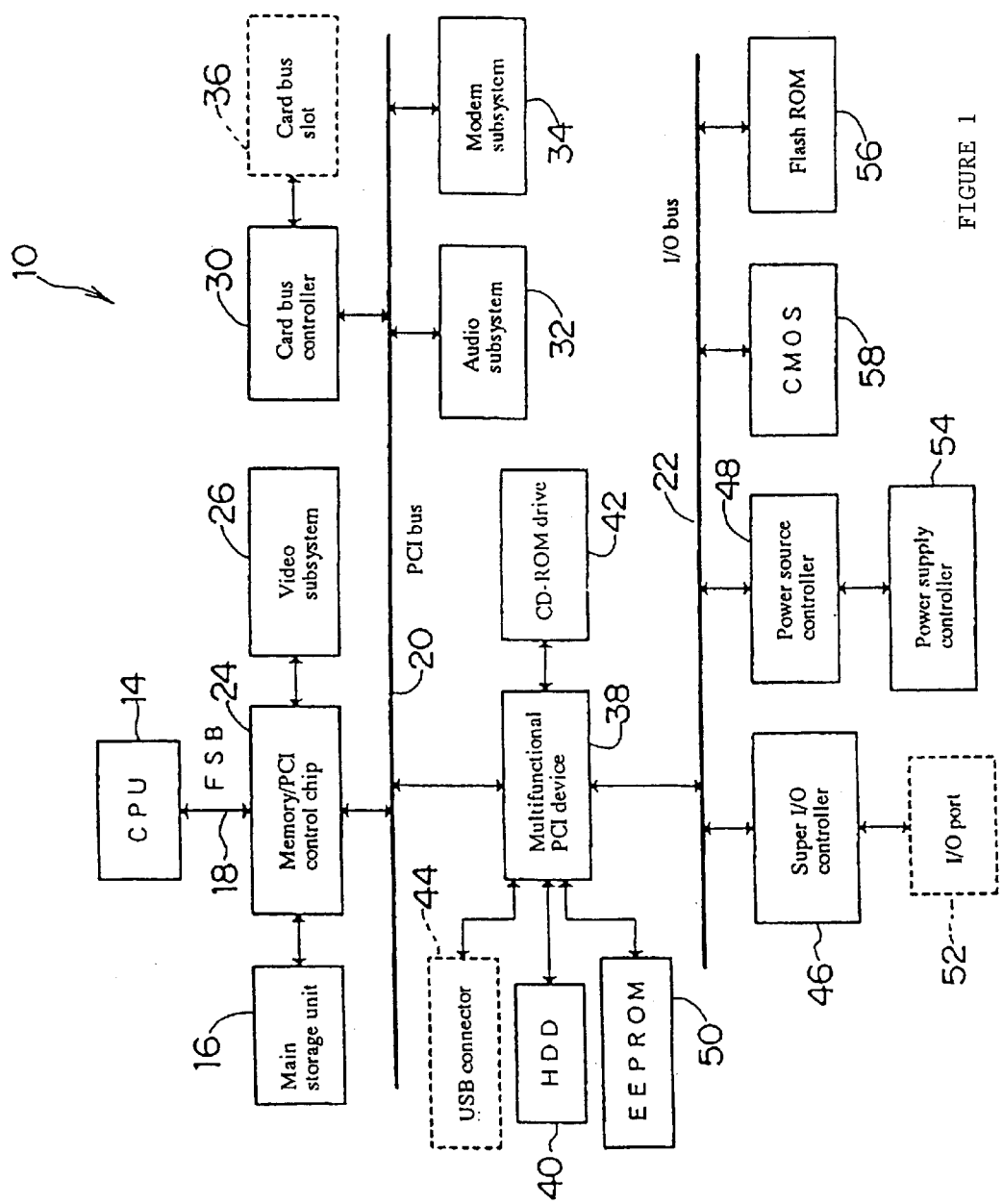
FIG. 1 is a block diagram showing the schematic construction of a computer system according to this embodiment.
Figure 2:
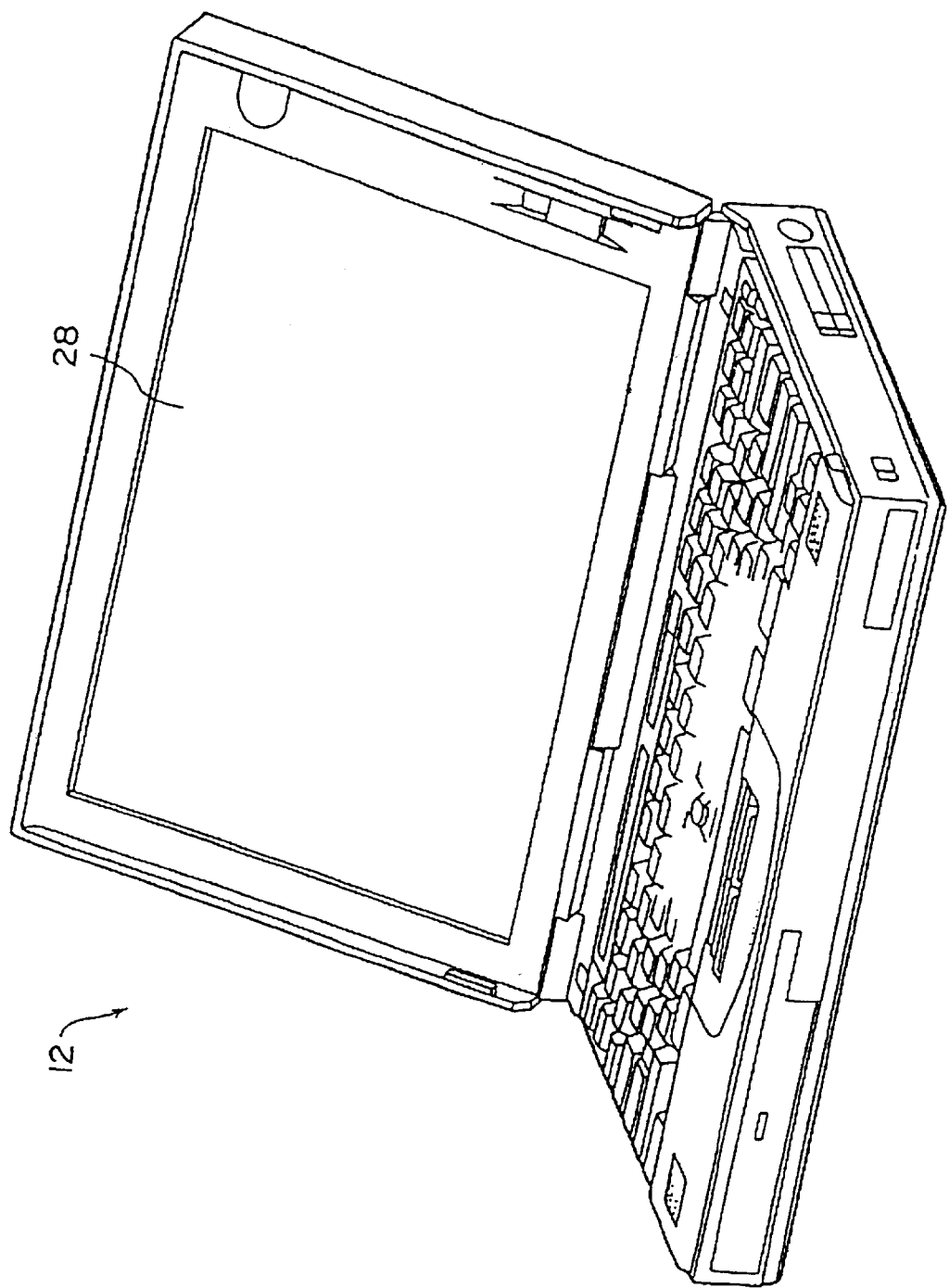
FIG. 2 is a perspective view showing the appearance of a notebook PC.

Hereinafter, an example of an embodiment of the present invention will be described in detail with reference to drawings. In FIG. 1, the hardware configuration of a computer system 10 comprising a personal computer (PC) that is typical and suitable for realizing the present invention is shown for each subsystem. An example of a PC realizing the present invention is a notebook PC 12 (refer to FIG. 2) that conforms to OADG (PC Open Architecture Developer's Group) specifications, and has MS Windows 98 or Windows NT, or IBM OS/2 as an operating system (OS). Hereinafter, each part of the computer system 10 will be described.

A CPU 14 that is a brain of the entire computer system 10 executes various types of programs under the control of an OS. The CPU 14 can be one of Intel CPU chips, that is, a Pentium, an MMX technology Pentium, and a Pentium Pro, a CPU made by AMD or other companies, or an IBM Power PC. The CPU 14 is configured to include an L2 (Level 2) cache that is a high-speed memory for reducing total access time to a main storage unit 16 by temporarily storing codes and data that are frequently accessed and extremely limited. Generally, the L2 cache is composed of an SRAM (Static RAM) chip, and its storage capacity is 512 KB or more.

The CPU 14 is mutually connected with hardware components, which are described later, via a three-layer bus, that is, an I/O bus 22 consisting of an FSB 18 as a processor-directly-coupled bus that is directly connected to its own external pins, a PCI (Peripheral Component Interconnect) bus 20 as a high-speed I/O device bus, and an ISA bus (Industry Standard Architecture) as a low-speed I/O device bus.

Generally, the FSB 18 and PCI bus 20 are communicated by a bridge circuit (a host-PCI bridge) called a memory/PCI control chip 24. The memory/PCI control chip 24 in this embodiment is configured to include a memory controller function for controlling access operation to the main storage unit 16, a data buffer for absorbing the difference between data transfer speeds of the FSB 18 and PCI bus 20, or the like. For example, as the memory/PCI control chip 24, an Intel 440EX or 440GX can be used.

The main storage unit 16 is a writable memory that is used as a read area of an execution program in the CPU 14, or a work area where data processed by the execution program is written. Generally, the main storage unit 16 is composed of a plurality of DRAM (Dynamic RAM) chips, has, for example, standard capacity of 32 MB, and can be increased to 256 MB. Recently, in order to meet the demand of further acceleration, DRAM has been changed to high-speed page DRAM, EDO DRAM, synchronous DRAM (SDRAM), burst EDO DRAM, RDRAM, or the like.

In addition, programs that are included in the execution program here described are an OS such as MS Windows 98, various types of device drivers for performing hardware manipulation of peripheral devices, an application program for a specific job, and firmware such as a BIOS (Basic I/O System: a program for controlling I/O operation of each hardware such as a keyboard, and a floppy disk drive) stored in flash ROM 56 (described later in detail).

The PCI bus 20 is a bus that can perform comparatively high speed data transmission (e.g., bus width: 32/64 bits, maximum operating frequency: 33/66100 MHz, and maximum data transmission speed: 132/264 MBps). PCI devices such as a card bus controller 30 that drive I/Os at comparatively high speed are connected to this. In addition, PCI architecture is first proposed by Intel Corp., and realizes a so-called PnP (Plug and Play) function.

A video subsystem 26 is a subsystem for realizing a function relating to video, and includes a video controller that actually processes a rendering instruction from the CPU 14, once writes rendering information, which is processed, in a video memory (VRAM), reads the rendering information from the VRAM, and outputs the rendering information on a liquid crystal display (LCD) 28 (see FIG. 2) as rendering data. In addition, the video controller can transform a digital video signal into an analog video signal by a digital-analog converter (DAC) attached. The analog video signal is outputted to a CRT port (not shown) via a signal line.

In addition, components attached to the PCI bus 20 respectively are a card bus controller 30, an audio subsystem 32, and a modem subsystem 34. The card bus controller 30 is a dedicated controller for directly coupling a bus signal in the PCI bus 20 to an interface connector (card bus) of a PCI card bus slot 36. A PC card (not shown) is inserted into the card bus slot 36, the PC card which is located in, for example, a wall surface of a body of the PC 12 and conforms to specifications (e.g., PC card Standard 95) laid down by PCMCIA (Personal Computer Memory Association)/JEIDA (Japan Electronic Industry Development Association).

Furthermore, communication lines such as a LAN and a telephone line are connected to a modem subsystem 34. The computer system 10 is made to be able to be connected to the Internet via these communication lines.

The PCI bus 20 and I/O bus 22 are mutually connected by a multifunctional PCI device 38. The multifunctional PCI device 38 has a bridging function between the PCI bus 20 and I/O bus 22, a DMA controller function, a programmable interrupt controller (PIC) function and a programmable interval timer (PIT) function, an IDE (Integrated Drive Electronics) interface function, a USB (Universal Serial Bus) function, and an SMB (System Management Bus) interface function. For example, an Intel PIIX4 can be used as the multifunctional PCI device 38.

In addition, the DMA controller function is a function for executing data transfer between peripheral devices (e.g., an FDD) and the main storage unit 16 without intervention of the CPU 14. Furthermore, the PIC function is a function of responding to an interrupt request (IRQ) from a peripheral device and booting a predetermined program (an interrupt handler) executed. Moreover, the PIT function is a function of generating a timer signal in a predetermined cycle, and its generation cycle is programmable.

In addition, an IDE hard disk drive (HDD) 40 is connected to an IDE interface implemented by the IDE interface function, and further an IDE CD-ROM drive 42 is also connected to the IDE interface in ATAPI (AT Attachment Packet Interface) connection. Furthermore, other types of IDE devices such as a DVD (Digital Video Disc or Digital Versatile Disc) drive can be connected instead of the IDE CD-ROM drive 42. External storage apparatuses like the HDD 40 and CD-ROM drive 42 are contained in, for example, docking areas that are in the body of the PC 12 and are called media bays or device bays. These external storage apparatuses that are standard equipment may be mounted exchangeably with and exclusively of other devices such as an FDD and a battery pack in some cases.

In addition, the main storage unit 16 corresponds to a main storage unit according to the present invention, and the HDD 40 corresponds to secondary storage unit according to the present invention.

Furthermore, the multifunctional PCI device 38 has a USB port, and this USB port is connected to, for example, a USB connector 44 provided in a wall surface of the body of the PC 12. The USB supports a function of enabling a new peripheral device (a USB device) to be plugged and unplugged with power being supplied (a hot-plugging function), and a function of automatically recognizing a peripheral device, which is newly connected, and resetting system configuration (a plug and play function). It is possible to perform daisy chaining of a maximum of 63 USB devices every USB port. Examples of the USB devices are various devices such as a keyboard, a mouse, a joystick, a scanner, a printer, a modem, a display monitor, and a tablet.

Moreover, an EEPROM 50 is connected to the multifunctional PCI device 38 via an SM bus. The EEPROM 50 is a memory for retaining information such as a password registered by a user, a supervisor password, and a product serial number, and is nonvolatile. Furthermore, its storage contents are electrically rewritable.

The I/O bus 22 is a bus having data transfer speed lower than that of the PCI bus 20 (e.g., bus width: 16 bits, and maximum data transfer speed: 4 MBps), and is used for connecting a Super I/O controller 46, a power source controller 48, flash ROM 56 comprising EEPROM, CMOS 58, and peripheral devices (none of them are shown), which operate at comparatively low speed, such as a real time clock (RTC) and a keyboard/mouse controller.

An I/O port 52 is connected to the Super I/O controller 46, which is a peripheral controller for controlling driving of a floppy disk drive (FDD), parallel data I/O (PIO) via a parallel port, serial data I/O (SIO) via a serial port.

The power source controller 48 mainly performs power management and thermal management of the computer system 10, and can be composed of a single-chip microcomputer comprising an MPU, RAM, ROM, and a timer. Programs and reference tables necessary for executing the power management and thermal management are stored in the ROM. A power supply controller 54 is connected to the power source controller 48. The power supply controller 54 includes a battery charger for charging a battery, and a DC/DC converter for generating DC constant-voltages such as 5 V and 3.3 V that are used in the computer system 10, and performs power control under the power source controller 48.

The flash ROM 56 is a memory for retaining programs of the firmware such as a BIOS, and a bootstrap code, is nonvolatile, and is made electrically rewritable. In addition, the CMOS 58 is configured so that volatile semiconductor memory is connected to a backup power supply, and functions as nonvolatile high-speed storage means.

In addition, in order to configure the computer system 10, many electric circuits besides the circuits shown in FIG. 1 are necessary. Nevertheless, since these are well known to those skilled in the art and do not configure the substance of the present invention, description of these are omitted in this specification. Furthermore, it is written in addition that, in order to avoid conflict of the drawing, only a part of connection between respective hardware blocks in the drawing is drawn.

Next, as an operation of this embodiment, first, booting of a first OS that is executed by turning on a power switch of the computer system 10 will be described with reference to a flow chart in FIG. 3. In addition, as the first OS, it is possible to use, for example, an OS having a file system such as MS Windows 98, MS Windows NT, and IBM OS/2.

When a power switch is turned on, an area of the flash ROM 56 is accessed, where a POST (Power On Self Test) program that is part of the BIOS is stored, and the POST program is executed. Accordingly, as shown in FIG. 3 as "System Test and Initialization Code," not only each piece of hardware of the computer system 10 is tested, but also the initialization (clear of the contents of the storage) of the main storage unit 16 is performed (step 100). Subsequently, the initialization of a hardware environment of the computer system 10 (concretely, initialization of an external hardware interrupt vector, initialization of external hardware, initialization of a software interrupt vector, or the like) is performed (step 102).

In addition, the main storage unit 16 has an area (system BIOS area: see FIG. 9 as an example) for storing firmware such as the BIOS including the POST or the like, the bootstrap code, and the secondary storage unit I/O service. The POST copies these pieces of firmware from the flash ROM 56 to the system BIOS area of the main storage unit 16. After that, the process of the POST jumps to an area of the system BIOS area in thie main storage unit 16, where the bootstrap code is stored, as expressed as "Jump to A Bootstrap code" in FIG. 3.

Consequently, the bootstrap code is executed, first, a plurality of boot drives (secondary storage unit (FDD, HDD 40, etc.) where a boot image of the OS may be stored: usually, an "A" drive (FDD) has the highest priority) is accessed in turn according to predetermined order so that the boot image of the OS to be booted is searched. In this embodiment, since the boot image of the first OS is stored in the HDD 40, the boot image of the first OS stored in the HDD 40 is detected as the boot image of an OS to be booted if an FD is not set in the FDD. Then, a series of instruction codes, which is used for loading the first OS in the main storage unit 16 (a loader of the first OS: this is located at the head of the boot image of the first OS), within the boot image of the first OS is loaded from the HDD 40 to the main storage unit 16 (step 106).

Figure 3:
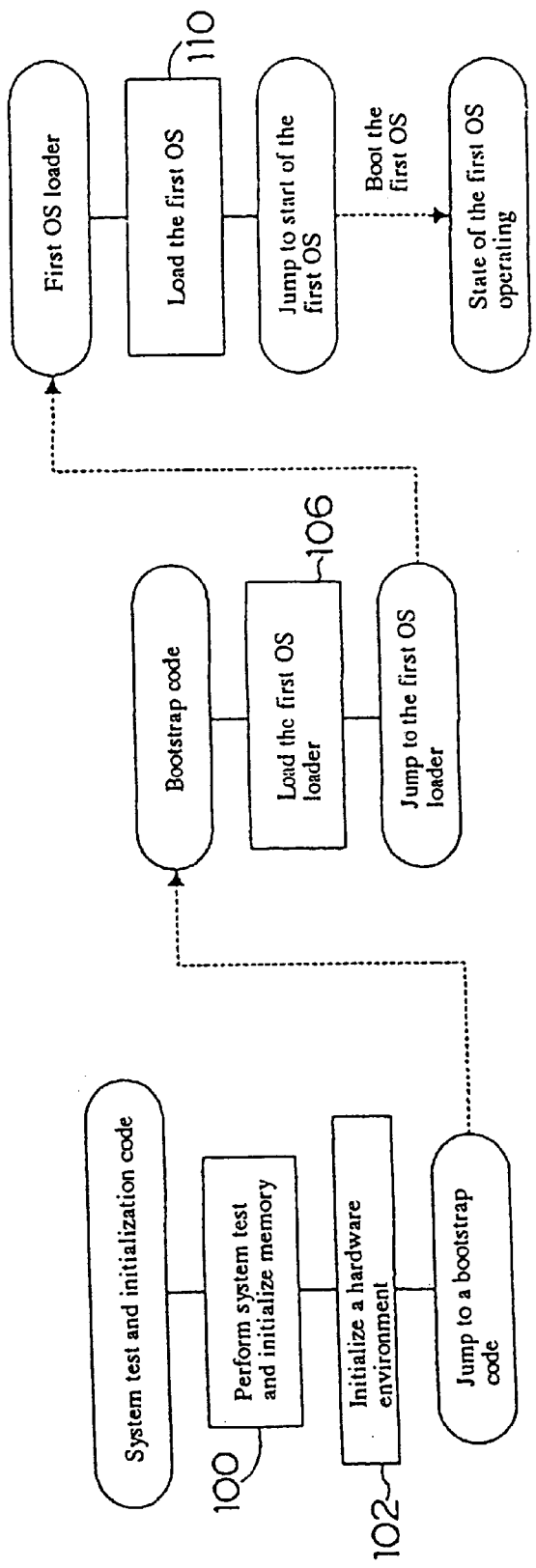
FIG. 3 is a flow chart showing the contents of processing of booting a first OS.

When processing by the bootstrap code is terminated, as shown as "Jump to First OS Loader" in FIG. 3, the process jumps to the top of the area, where the loader of the first OS is loaded, out of the memory area of the main storage unit 16. Then, the loader program of the first OS (the series of instruction codes) is executed. Owing to this, a series of instruction codes, corresponding to the body of the first OS, within the boot image of the first OS is loaded from the HDD 40 to the main storage unit 16 (step 110).

When processing by the loader of the first OS is terminated, the process jumps to the start address of the first OS, which is determined beforehand by the loader and OS, within the memory area of the main storage unit 16 as described as "Jump to Start of First OS" in FIG. 3. Then, the program of the first OS (the series of instruction codes) is executed. Owing to this, the first OS is booted, and operates on the computer system 10.

Next, such a series of processing that boots the second OS, which is different from the first OS, from a state of the first OS operating, and makes a predetermined application executed under the control of the second OS will be described with reference to flow charts in FIGS. 4 and 5. In addition, hereinafter, as an example of the second OS, a case of using DOS will be described.

Figure 4:
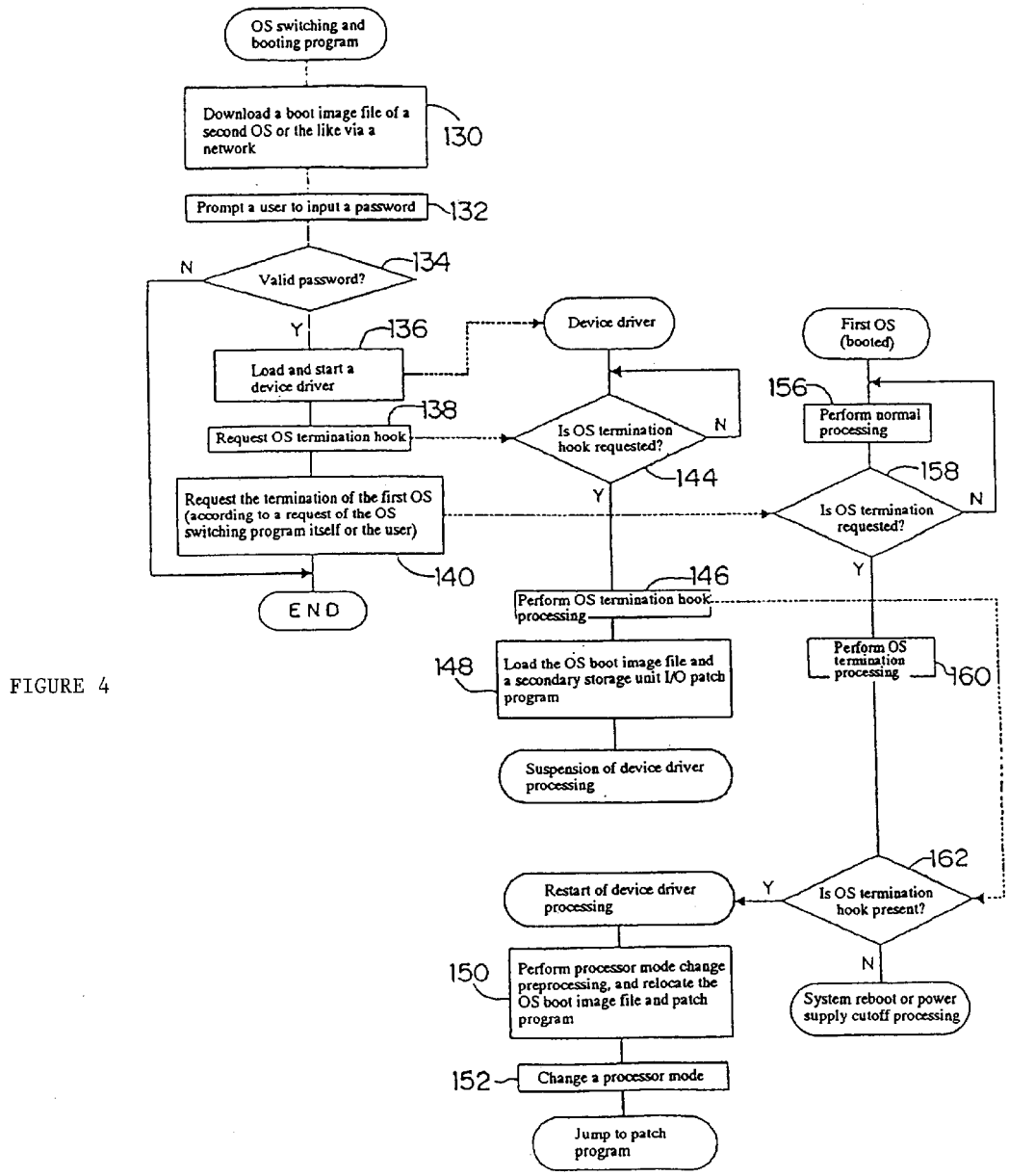
FIG. 4 is a flow chart showing the contents of preprocessing (processing by an OS switching and booting program and device drivers) for booting a second OS from a state of the first OS operating.
Figure 5:
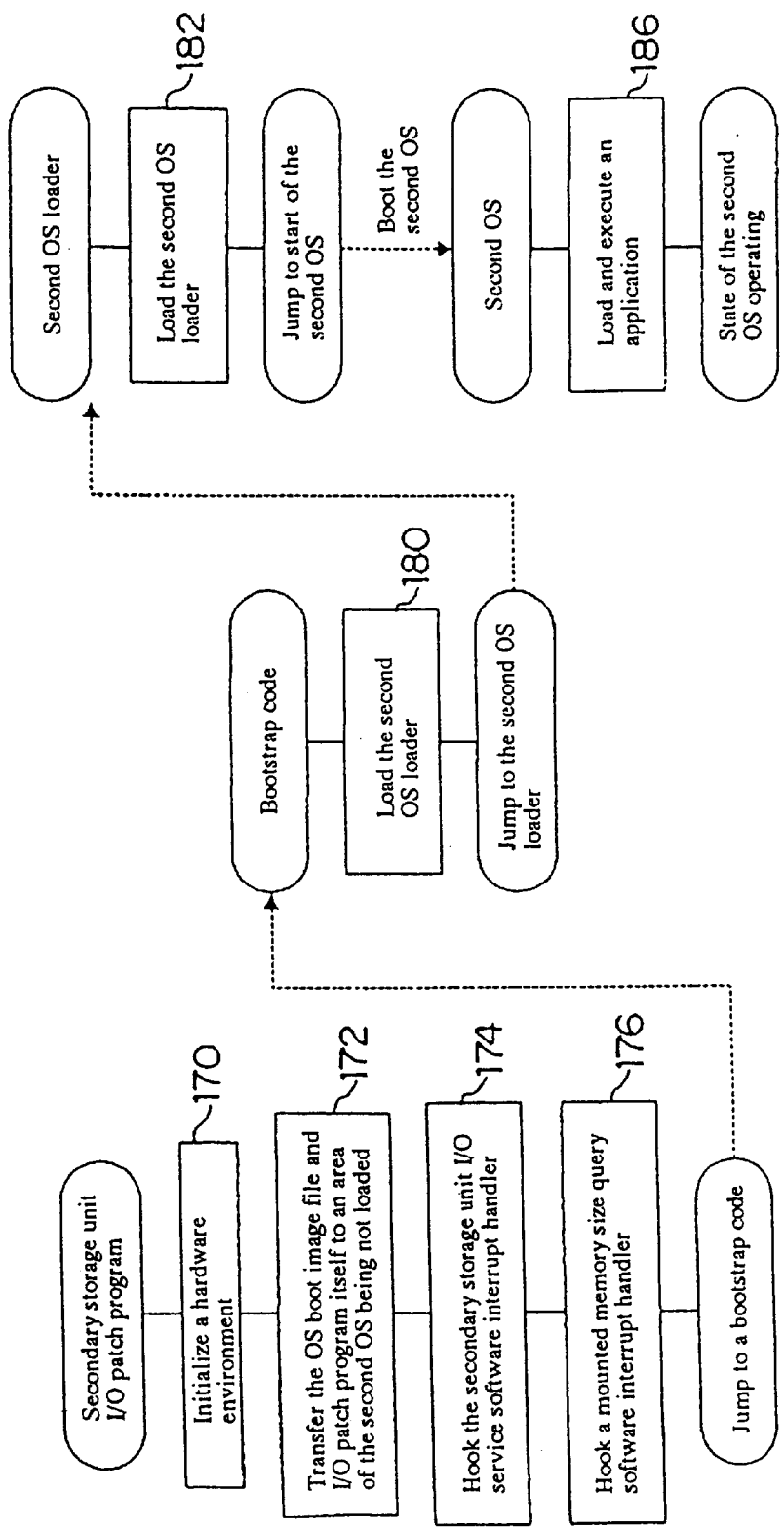
FIG. 5 is a flow chart showing the contents of a series of processing (processing by a secondary storage unit I/O patch program or the like) of booting a second OS subsequently to the processing shown in FIG. 4 to make a predetermined application executed.

Execution of the series of processing shown in FIGS. 4 and 5 is started by a system or a user starting an OS switching and booting program. Furthermore, the OS switching and booting program can be acquired by downloading the OS switching and booting program from a server similarly to, for example, step 130 described later. Moreover, the OS switching and booting program can also be installed in the HDD 40, etc. as an application program to be executed under the control of the first OS.

At the step 130, information for booting the second OS and executing a predetermined application under the control of the second OS is downloaded from the server via a network (e.g., the Internet) under the control of the first OS. In addition, in this embodiment, the information for booting the second OS is composed of a boot image file of the second OS, device drivers, and a secondary storage unit I/O patch program The boot image file of the second OS includes a second OS loader, a body of the second OS, and a predetermined application to be executed under the control of the second OS.

Figure 6:
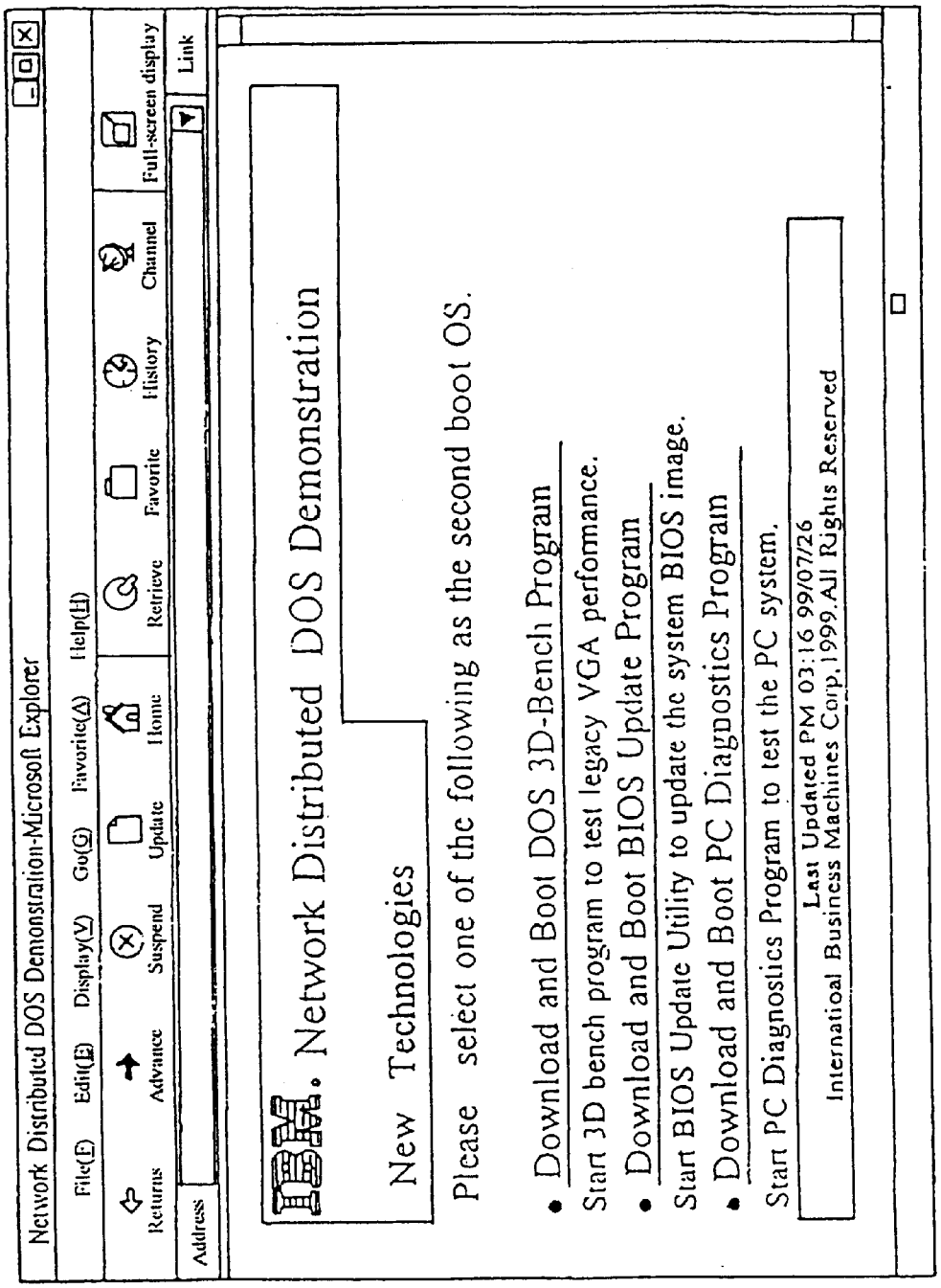
FIG. 6 is a screen shot showing an example of a screen image in the case of downloading information for accessing a homepage and booting the second OS to make a predetermined application executed.

There are various methods as download methods, one of which is to perform download by a user of the computer system 10 starting browsing software (browser) and accessing a homepage for download that is provided by a server. As an example, in a homepage shown in FIG. 6, names of a plurality of application programs are displayed respectively, the plurality of downloadable application programs which can be executed under the control of the second OS (in the example shown in FIG. 6, three types of programs, that is, a program for performing a bench mark test to the computer system 10, a BIOS update program, and a program for performing the self diagnosis of the computer system 10).

In this case, as an example, first, the OS switching and booting program is downloaded from the server to the computer system 10 as a binary file when the user selects a name of an application program that the user desires to execute, and the process at the step 130 is started by the OS switching and booting program being started on the computer system 10.

Therefore, it is possible to make the boot image file of the second OS that includes the application program selected, the device drivers, and secondary storage unit I/O patch program downloaded in turn as binary files.

Figure 7:
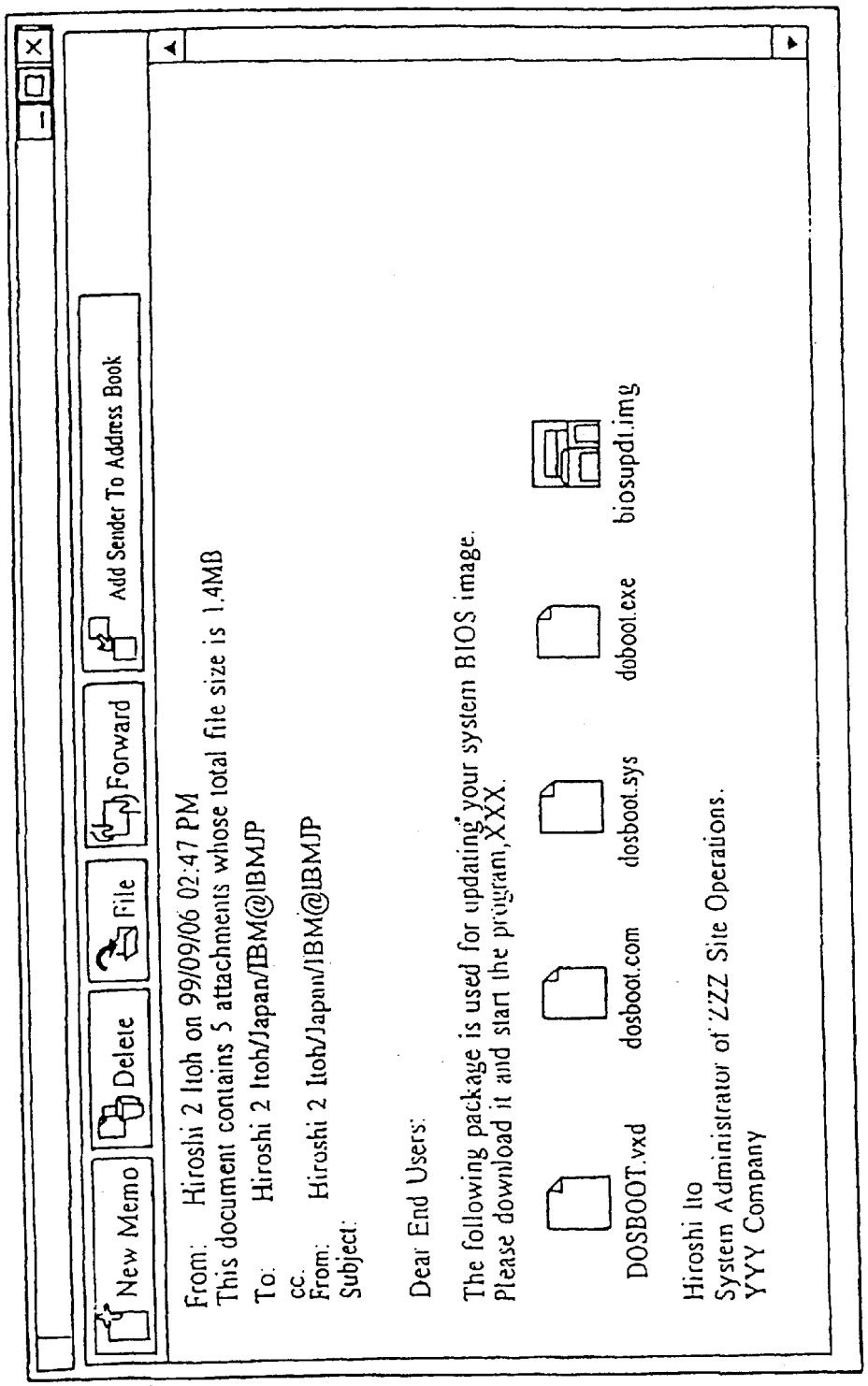
FIG. 7 is a screen shot showing an example of a screen image in the case of receiving information, which is used for booting the second OS and executing a predetermined application program, as an attachment to e-mail.

In addition, another download method is to receive the boot image file of the second OS, device drivers, and the secondary storage unit I/O patch program (and OS switching and booting program) as attachments to e-mail, as an example shown in FIG. 7.

In an example shown in FIG. 7, e-mail is received by the computer system 10 and an screen image kept in a state where the received e-mail is opened is shown, the e-mail which is sent by a mailer attaching the boot image file of the second OS (in FIG. 7, this is expressed as "biosupdt.img") including application program updating the BIOS, the OS switching and booting program (in FIG. 7, this is expressed as "doboot.exe"), device drivers (in FIG. 7, these are expressed as "dosboot.sys" and "DOSBOOT.vxd"), and secondary storage unit I/O patch program (in FIG. 7, this is expressed as "dosboot.com"), as binary files. By once downloading these binary files into a temporary directory of the secondary storage unit and clicking an icon of the OS switching and booting program expressed as "doboot.exe," the OS switching and booting program is loaded into the main storage unit 16, and processing at and after the next step 132 is executed.

In addition, all of the various types of download described above are download under the control of the first OS, and it is possible to perform the download with a general-purpose protocol without depending on a specific protocol for remotely booting another OS. Furthermore, the device drivers, secondary storage unit I/O patch program, and boot image file of the second OS that are downloaded are recognized as files by the first OS, and are once stored in the HDD 40 under the control of the file system of the first OS.

Figure 8:
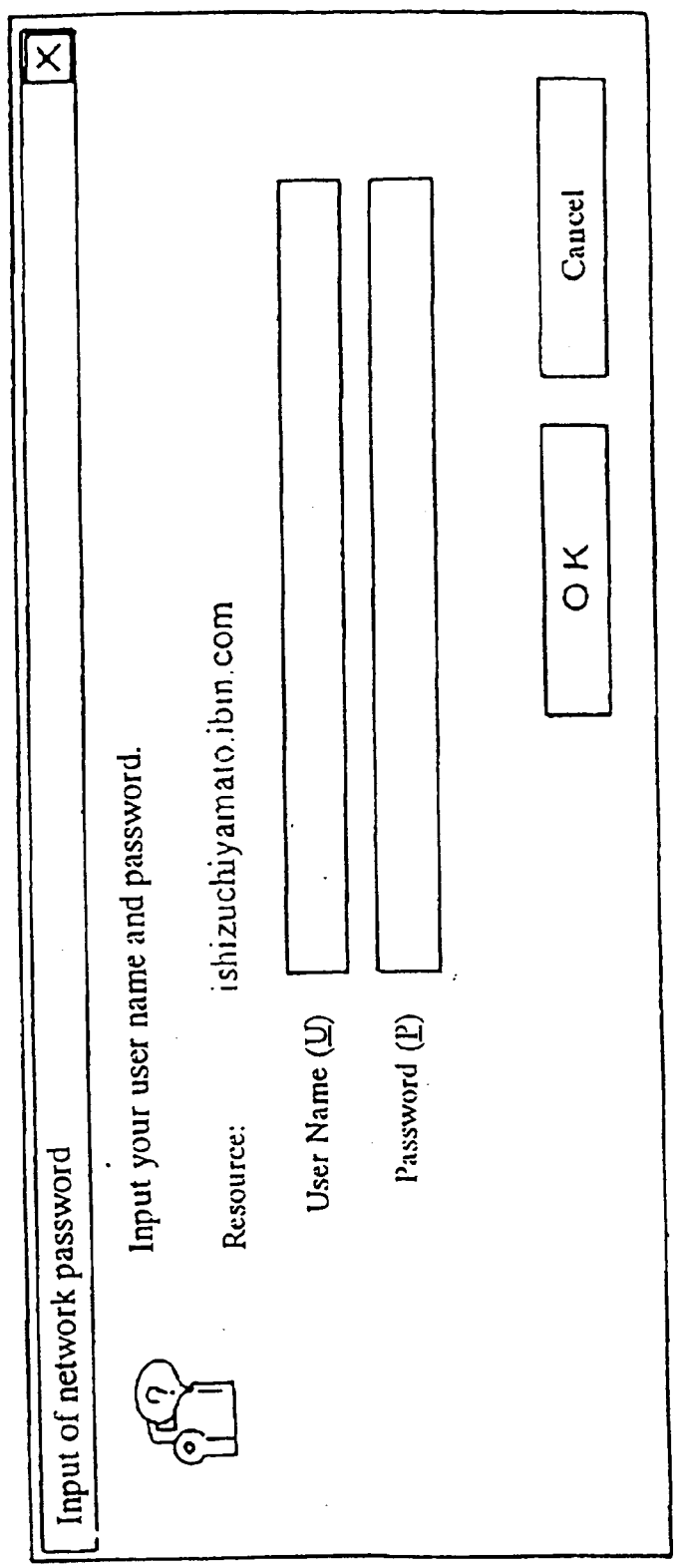
FIG. 8 is a screen shot showing an example of a screen image at the time of verifying a user with a password.

At the next step 132, the user is requested to input his/her password with a password input screen being displayed on an LCD 28, the password input screen which is shown in FIG. 8 as an example, or the like. If the password does not coincide with a valid password, judgment at step 134 is negated, and the processing by the OS switching and booting program is terminated. In this case, the processing at and after the next step 136 is not executed and hence the second OS is never booted. Therefore, it is possible to prevent the invalid use of the computer system 10 by a person other than an authorized user. In addition, it is not limited at the timing described above to verify whether the user is valid, but it can be performed when the device drivers, secondary storage unit I/O patch program, or boot image file of the second OS that is managed by the file system of the first OS is accessed.

Furthermore, if the password coincides with the valid password, the judgment at the step 134 is affirmed, and the process goes to step 136. Then, after loading device drivers (binary files composed of series of instruction codes), which is stored in the HDD 40 as a file, as resident code in the main storage unit 16 (in detail, these are loaded as code, which is not unloadable and always exists in the main storage unit 16, for receiving the control from the code hooked after the termination of the first OS (this will be described later in detail)), the device drivers are started. The device drivers started wait until the hook of OS termination is requested from the OS switching and booting program (step 144).

After starting the device drivers, the OS switching and booting program requests the hook of OS termination to a device driver at the next step 138. Owing to this, the device driver hooks the termination of the first OS. Thus, if being instructed to execute the termination processing, for example, for reboot of the computer system 10 or shutdown of the power, the first OS performs a series of OS termination processing such as terminating all the application programs started, closing all the files opened, and storing data if necessary. Then, the first OS jumps to a program (this is also part of the OS), performing the reboot of a computer system or the shutdown of the power, after the completion of the OS termination processing.

The jump to the program performing the reboot of the computer system (or shutdown of the power) is an indirect jump of referring to a table, where a jump destination is registered, and jumping to the jump destination registered in the table. As the device driver hooks the termination of the first OS by rewriting the jump destination registered in the table, the control of the CPU 14 jumps to an area, where the device driver is loaded, the memory area of the main storage unit 16 after the completion of OS termination processing instead of jumping to a program performing the reboot of the computer system (or shutoff of the power). Thus, the device driver makes the control of the CPU 14 to move to itself (device driver).

In addition, after performing the hook processing of the termination of the first OS, the device driver requests the first OS at step 148 to secure a work area in the memory area of the main storage unit 16. Furthermore, the device driver loads the secondary storage unit I/O patch program, and a boot image file of the second OS (all of them are binary files composed of series of instruction codes), which are stored in the HDD 40 as files, into the work area (area that is not overwritten under the control of the first OS) secured by the first OS (see "secondary storage unit I/O patch program" and "DOS boot image" in FIG. 9A). Then, the device driver suspends the processing after the execution of the processing at step 148.

On the other hand, after requesting the hook of the OS termination of the device driver, the OS switching and booting program requests the termination of the OS of the first OS at the next step 140. This OS termination request is performed by the OS switching and booting program itself calling an OS service designating the termination of the first OS or by a user's interactive operation (e.g., by displaying "The application downloaded will be executed by designating the termination of the OS currently operating" on the LCD 28 to the user, the user designates the termination of the OS according to this guide message). If the termination of the OS is requested as described above, the OS switching and booting program terminates the processing.

The first OS operating performs normal processing (step 156) until the OS termination request is issued (the judgment at step 158 is affirmed). Nevertheless, if being designated by the OS switching and booting program to terminate the OS, the judgment at the step 158 is affirmed. Then, the first OS performs a series of OS termination processing such as terminating all the application programs started, closing all the files opened, and saving data if necessary, similarly to a case where the first OS is designated in usual procedure to reboot the computer system 10 or to shut off the power (step 160).

Here, if the reboot of the computer system 10 or shutoff of the power is designated in the usual procedure, the hook of the OS termination (step 146) is not performed judgment at step 162 is negated). Therefore, the process jumps to a program performing the reboot of the computer system or the shutoff of the power, and the reboot of the computer system or the shutoff of the power is performed. Nevertheless, if the hook of the OS termination is performed (judgment at step 162 is affirmed), the processing by the device driver is restarted by the control of the CPU 14 moving to the device driver after the completion of the OS termination processing.

By the way, DOS used as the second OS in this embodiment operates in such a state that a processor (CPU 14) mode is a real mode, but another OS usable as the first OS (Windows 98, Windows NT, OS/2, or other OS exemplified as a first OS of the present embodiment) operates in such a state that the processor mode is a mode except the real mode. For this reason, it is necessary to change a processor mode so as to boot the second OS. Nevertheless, if a processor mode is changed, a virtual storage mechanism nary become effective or ineffective (e.g., if a processor mode is changed from a mode where an OS such as Windows is operable to the real mode, the virtual storage mechanism changes from "effective" to "ineffective").

Therefore, at the next step 150, the device driver restarted loads a series of program codes (a series of instruction codes changes a processor mode) for changing the processor mode to a mode where the second OS is operable (in this embodiment, the real mode) in an area, whose virtual address and physical address are the same (an area that is recognized as the same area even if the virtual storage mechanism is changed from "effective" to "ineffective" (or vice versa)), within the memory area of the main storage unit 16 as preprocessing for changing the processor mode.

Furthermore, it is also necessary to be able to access the secondary storage unit I/O patch program and boot image file of the second OS, which have already been loaded in the main storage unit 16, in a mode where the second OS is operable. Therefore, at the step 150, the device driver secures an area that is physically continuous in the memory area of the main storage unit 16, and transfers (relocates) the secondary storage unit I/O patch program and boot image file of the second OS to the area secured.

After the processing described above, the control of the CPU 14 jumps to the area, where the series of program codes was loaded at the step 150, within the memory area of the main storage unit 16 to execute the series of program codes. Owing to this, the processor mode itself changes to the mode (real mode) where the second OS is operable (step 152). In addition, the series of program codes changing the processor mode is loaded in the area whose virtual address and physical address are the same. Therefore, regardless of the transition of the processor mode, it is possible to normally execute the series of program codes to the last.

When executing the series of program codes to the last and completing the change of the processor mode, as expressed as "Jump to patch program" in FIG. 4, the control of the CPU 14 jumps to the area where the secondary storage unit I/O patch program was transferred at the previous step 150, within the memory area of the main memory 16. Then, the secondary storage unit I/O patch program is started. Hereinafter, processing realized by the secondary storage unit I/O patch program will be described with reference to a flow chart in FIG. 5.

At step 170, as if the firmware of the computer system 10 directly loads the second OS (as if the second OS is loaded as the first OS), the secondary storage unit I/O patch program performs the initialization of a hardware environment (concretely, initialization of an external hardware interrupt vector, initialization of external hardware, initialization of a software interrupt vector, or the like) instead of the POST that is part of the BIOS. In addition, a secondary storage unit I/O service interrupt vector that is part of the software interrupt vector is reinitialized as described later.

Furthermore, in order to boot the second OS, the boot image file of the second OS and the secondary storage unit I/O patch program that are stored in the main storage unit 16 should not be broken (overwritten) by loading a body of the second OS into the main storage unit 16. For this reason, at the next step 172, the secondary storage unit I/O patch program transfers the boot image file of the second OS and the secondary storage unit I/O patch program itself to an area which is not overwritten by loading the second OS (an area in which the body of the second OS is not loaded and which is not used as a work area of the second OS).

Figure 9:
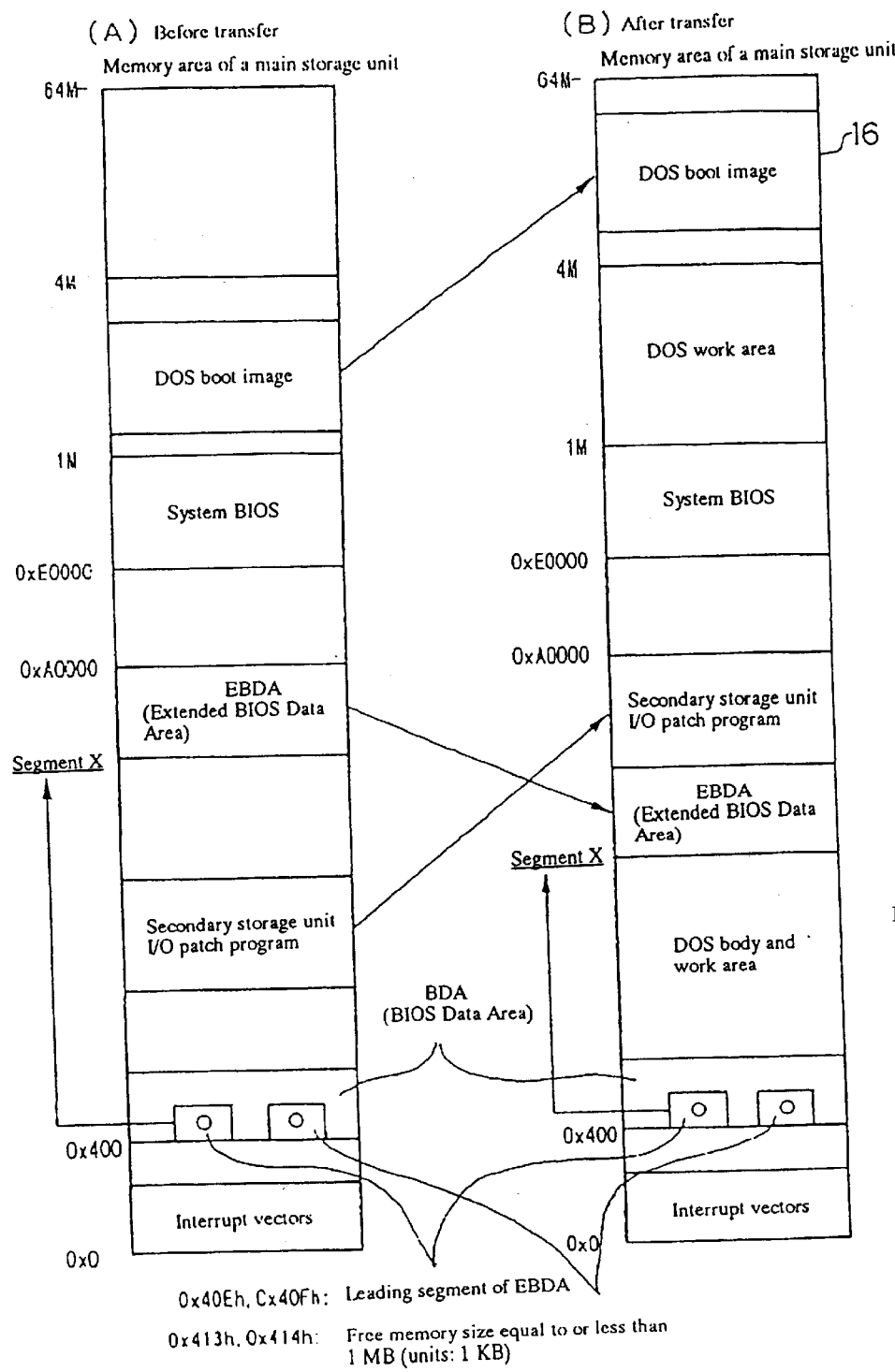
FIG 9A is an image drawing showing a memory map of a main storage unit before a secondary storage unit I/O patch program and a boot image file of the second OS are transferred.
FIG. 9B is an image drawing showing a memory map of the main memory after the secondary storage unit I/O patch program and the boot image file of the second OS are transferred and the second OS is booted.

Concretely, for example, under the control of DOS as the second OS, as shown in FIG. 9, an area, which has a leading address of E0000h ("h" denotes hexadecimal notation) and predetermined size, in the memory area of the main storage unit 16 is used as an area (system BIOS area) for storing instruction code of the firmware such as the BIOS including the POST, the bootstrap code, and secondary storage unit I/O service. Furthermore, an area that has a leading address of 400h and predetermined size is used as an area (BDA: BIOS Data Area) for storing data of the firmware.

Moreover, a second area (EBDA: Extended BIOS Data Area) for storing data of the firmware is also provided separately from the BIOS data area in the storage area of the main storage unit 16. The leading address of this extended BIOS data area is stored in the addresses 40Eh and 40Fh of the BIOS data area as data (usually, data stored in the addresses 40Eh and 40Fh indicate a segment X: see FIG. 9A).

For this purpose, at step 172, the secondary storage unit I/O patch program rewrites data, stored in the addresses 40Eh and 40Fh of the BIOS data area, so that the extended BIOS data area may start from a segment Y having an address lower than the address of the segment X (in detail, an address that is lower by the extent of corresponding to the size necessary for storing the secondary storage unit I/O patch program) (owing to this, the size of the extended BIOS data area is expanded). Furthermore, the secondary storage unit I/O patch program transfers the secondary storage unit I/O patch program itself to an empty area in the trailing side of the extended BIOS data area expanded in size (see FIG. 9B).

In addition, data expressing the size of empty areas in an area from address 0h to 1 MB in the memory area of the main storage unit 16 is stored in addresses 413h and 414h of the BIOS data area. In connection with expanding the size of the extended BIOS data area as described above, data stored in the addresses 413h and 414h is also rewritten. Owing to this, it is possible to prevent the secondary storage unit I/O patch program from being overwritten and broken by loading the body of DOS in the extended BIOS data area expanded (including an area where the secondary storage unit I/O patch program itself is transferred), or the like.

Furthermore, the boot image file of the second OS is transferred to an area having an address that is higher by the extent of separating by, for example, 4 MB or more from the leading address of the main storage unit 16. Owing to the hook (this will be described later in detail) of a mounted memory size query software interrupt handler, the body of DOS is never loaded into this area, and this area is never used as a work area of DOS. Therefore, it is also possible to prevent the boot image file of the second OS from being overwritten and broken.

Moreover, a table (interrupt vectors) where jump destinations at the time of software interrupts occurring are stored every interrupt factor is stored in an area having predetermined size and a leading address of 0h in the main storage unit 16. If a secondary storage unit I/O service interrupt (interrupt factor=INT13h) among various software interrupts occurs, the interrupt vector is initialized so as to jump to the firmware (secondary storage unit I/O service (INT13h handler)) stored in the system BIOS area. Then, a secondary storage unit designated is accessed via the secondary storage unit I/O service of the firmware.

Against this, at the next step 174, if the secondary storage unit I/O service interrupt occurs, the secondary storage unit I/O patch program hooks the secondary storage unit I/O service software interrupt handler by rewriting the interrupt vector so as to jump to the INT13h handler that is part of the secondary storage unit I/O patch program.

Figure 10:
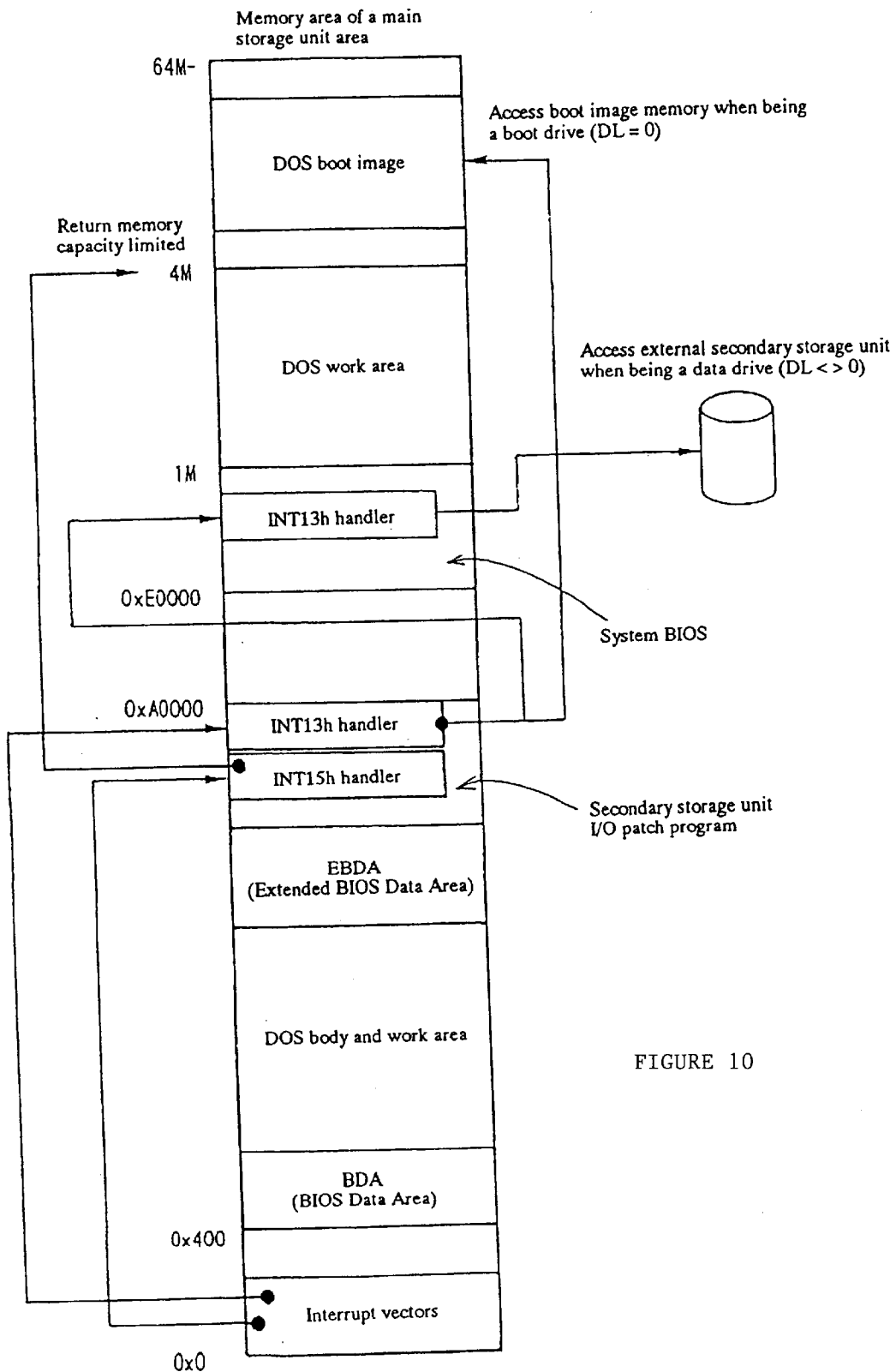
FIG. 10 is an image drawing for explaining the hook of a secondary storage unit I/O service software interrupt and hook of a mounted memory size query software interrupt.

When being started by jumping from the interrupt vector, the INT13h handler in the secondary storage unit I/O patch program first checks a value of a DL register inside the processor (the value of the DL register shows a drive number of the secondary storage unit accessed). Then, if the value of the DL register is a value (DL=0) showing the read service from a drive of the secondary storage unit whose priority is highest (usually, an FDD), the INT13h handler controls processing so that an area, where the boot image file of the second OS is stored, the memory area of the main storage unit 16 may be accessed and read as shown in FIG. 10.

On the other hand, if the value of the DL register is another value ($DL^1 0$), the INT13h handler controls the processing so as to jump to the secondary storage unit I/O service of the firmware. In this case, as shown in FIG. 10, a drive of the secondary storage unit designated by the DL register is accessed.

In addition, generally, if a software interrupt (interrupt factor=INT15h) inquiring the mounted memory (a main storage unit 16) size is generated by an OS or a program executed by the OS, a computer system provides the service of giving notice of the mounted memory size (mounted memory size query). Some among OSs or programs executed by the OSs acquire the mounted memory size by generating the mounted memory size query software interrupt at the time of initialization respectively, and request to use an area to the upper-limit address of the mounted memory as a work area of itself respectively.

For this reason, at the next step 176, if the mounted memory size query software interrupt is generated, the secondary storage unit I/O patch program hooks the mounted memory size query software interrupt handler by rewriting the interrupt vector so as to jump to the INT15h handler that is part of the secondary storage unit I/O patch program.

When being started by jumping from the interrupt vector, the INT15h handler of the secondary storage unit I/O patch program changes the mounted memory size, of which an interrupt source is informed, into a value meaning that the memory area of the mounted memory is just to an address (e.g., an address of an area separating by 4 MB from the leading address of the main storage unit 16) lower than an area where the boot image file of the second OS is stored. Owing to this, it seems to the interrupt source (an OS or a program executed by the OS) that the area where the boot image file of the second OS is stored is not implemented. Therefore, it is possible to prevent the boot image file of the second OS from being overwritten.

By the above step, the processing by the secondary storage unit I/O patch program is terminated, the process jumps to an area, where the bootstrap code is stored, within the system BIOS memory area of the main storage unit 16 as expressed as "Jump to A Bootstrap Code" in FIG. 5. Then, the bootstrap code is executed.

Owing to this, in order to first verify whether the boot image of the OS to be booted is present in a boot drive having the highest priority, a value of the DL register is made to be zero and the secondary storage unit I/O service interrupt (Interrupt INT13h) is generated. Nevertheless, as described above, the secondary storage unit I/O service interrupt is hooked by rewriting the interrupt vector. Hence, an area, where the boot image file of the second OS is stored, out of the memory area of the main storage unit 16 is accessed via the INT13h handler of the secondary storage unit I/O patch program. Then, the boot image of the second OS is found as the boot image of the OS to be booted.

Furthermore, a series of instruction codes (second OS loader: this is located at the head of the boot image of the second OS), which is used for loading the body of the second OS into the main storage unit 16, within the boot image of the second OS is loaded into a predetermined area of the main storage unit 16 (step 180).

Moreover, the leading address of the boot image file of the second OS is apparent for the secondary storage unit I/O patch program. Hence, loading of the second OS loader (step 180) which is executed by the bootstrap code can be realized by the secondary storage unit I/O patch program directly accessing an area of the boot image file of the second OS in the main storage unit 16 and transferring the boot image file into a predetermined area of the main storage unit 16. With following the above procedure, it is possible to boot the second OS regardless of the boot drive priority of the bootstrap code.

When the processing by the bootstrap code is terminated, the process jumps to the head of the area, where the second OS loader is loaded, within the memory area in the main storage unit 16 as expressed as "Jump to Second OS" in FIG. 5. Then, a program (a series of instruction codes) of the second OS loader is executed. Owing to this, a series of instruction codes, corresponding to the body of the second OS, within the boot image of the second OS is loaded into a predetermined area (an area that is expressed as "DOS body and work area" in FIGS. 9A, 9B, and 10) in the main storage unit 16 (step 182).

When the processing by the second OS loader is terminated, the process jumps to a start address of the second OS, which is predetermined by the loader and OS, within the memory area of the main storage unit 16 as expressed as "Jump to Start of Second OS" in FIG. 5. Then, a program (a series of instruction codes) of the second OS is executed. Owing to this, the second OS is booted, and hence the computer state becomes such a state that the second OS operates on the computer system 10.

In addition, the boot image file of the second OS includes a predetermined application program to be executed under the control of the second OS. Hence, when the second OS is booted, the predetermined application program is loaded in a predetermined area of the main storage unit 16, and predetermined processing (e.g., a bench mark test of the computer system 10, BIOS update, self diagnosis of the computer system 10, or the like) is performed (step 186). Furthermore, the load and execution of this application program can be automatically performed, or can be performed according to a user's designation.

In this manner, in this embodiment, so long as the information for booting the second OS and executing a predetermined application under the control of the second OS is downloaded, and the OS switching and booting program is started, the second OS is automatically booted thereafter, and the predetermined application is executed. Therefore, it is possible to easily realize the switching of an OS to be booted on a computer. Moreover, since the above-described information is downloaded under the control of the first OS, it is possible to download the information by a general-purpose protocol without depending on a specific protocol for booting the second OS remotely. Therefore, this is excellent in general versatility.

In addition, the boot of the second OS in this embodiment is performed by storing the boot image file of the second OS and other programs in the main storage unit 16. Hence, this can be applied even if an FDD is not implemented in the computer system 10, and makes complicated work unnecessary, the complicated work which is to divide a storage area of a hard disk or the like into a plurality of partitions and to rewrite a master boot record.

Furthermore, in this embodiment, when a predetermined application program is executed under the control of the second OS, the information including the predetermined application program is downloaded. Therefore, it is possible to easily acquire a newest-version program as the predetermined application program.

Moreover, in this embodiment, assume that, in such a state that the predetermined application has been completely executed and the second OS is operating, such operation that the reboot of the computer system 10 is designated or the power is applied again after the power of the computer system 10 was shut off is performed. In this case, a normal sequence shown in FIG. 3 is executed, and hence it is possible to automatically reboot the first OS without any particular operation.

In addition, hereinbefore, although such a case where the second OS is booted from a state of the first OS operating is described, the present invention is not limited to the above case, but it is also possible to boot three or more types of OSs in turn. Two methods are conceivable as methods for booting three or more types of OSs in turn.

Figure 11:
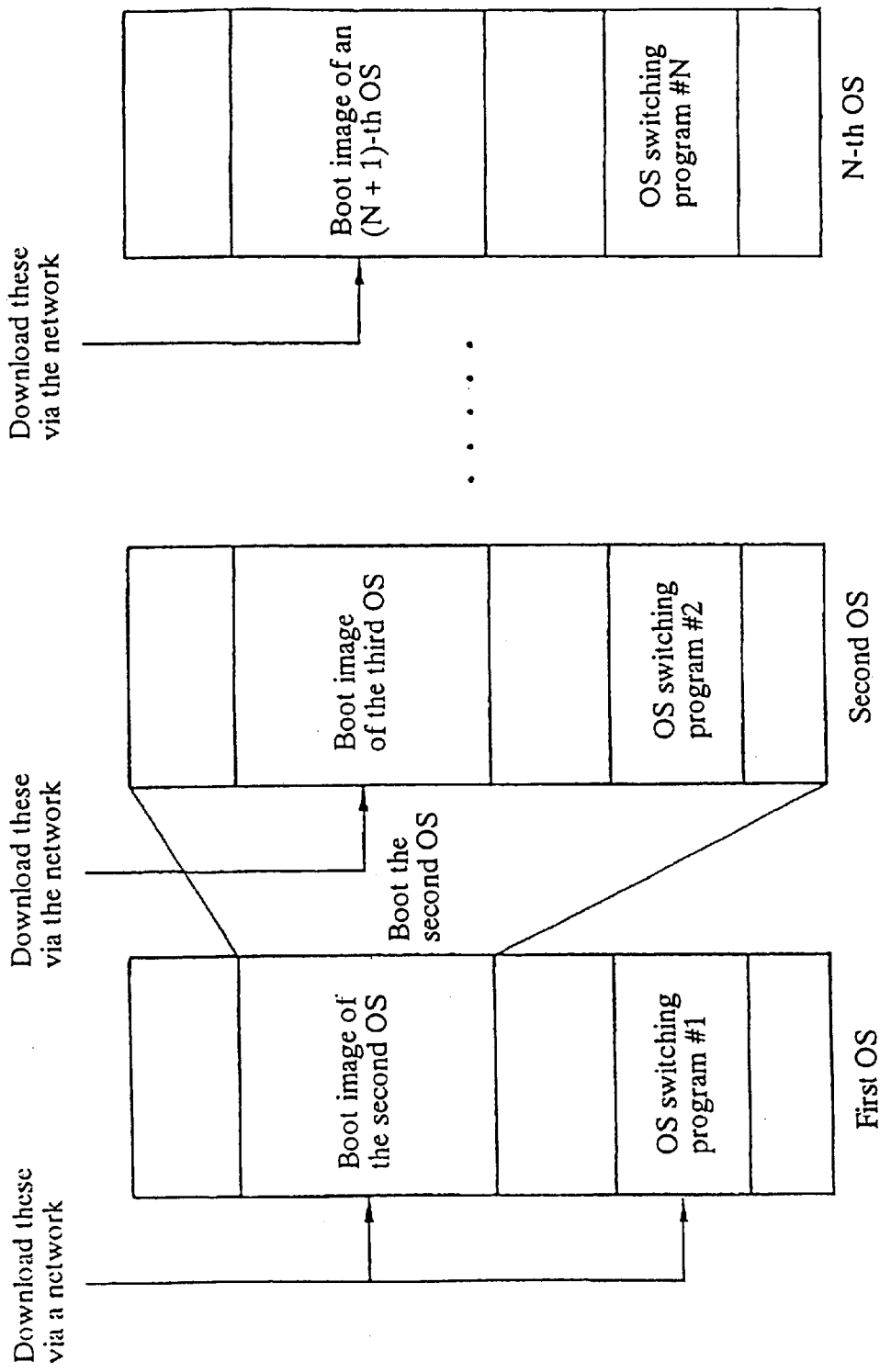
FIG. 11 includes image drawings showing an example of a method of downloading and booting boot images in the case of booting three or more kinds of OSs in turn.

A first method is a method applicable in such a case where each of the OSs to be booted in turn has a communication function via a network. Thus, as shown in FIG. 11, this is a method of repeating the procedure of downloading information, which is necessary for booting a next (N+1)-th OS, in a state where an N-th OS is operating, and booting the (N+1)-th OS. According to this first method, it is unnecessary to access the information (there is such a possibility that this information is stored in a local disk or a memory area under the control of the (N−1)-th or former OS) downloaded by the (N−1)-th or former OS at the time of switching from the N-th OS to the (N+1)-th OS. Therefore, this method has such an advantage that this method can also be applied in such a case where OSs to be booted in turn have mutually different file systems, and OSs are in such an environment that an information memory area shared with a plurality of OSs cannot be secured because memory address spaces are separated.

Figure 12:
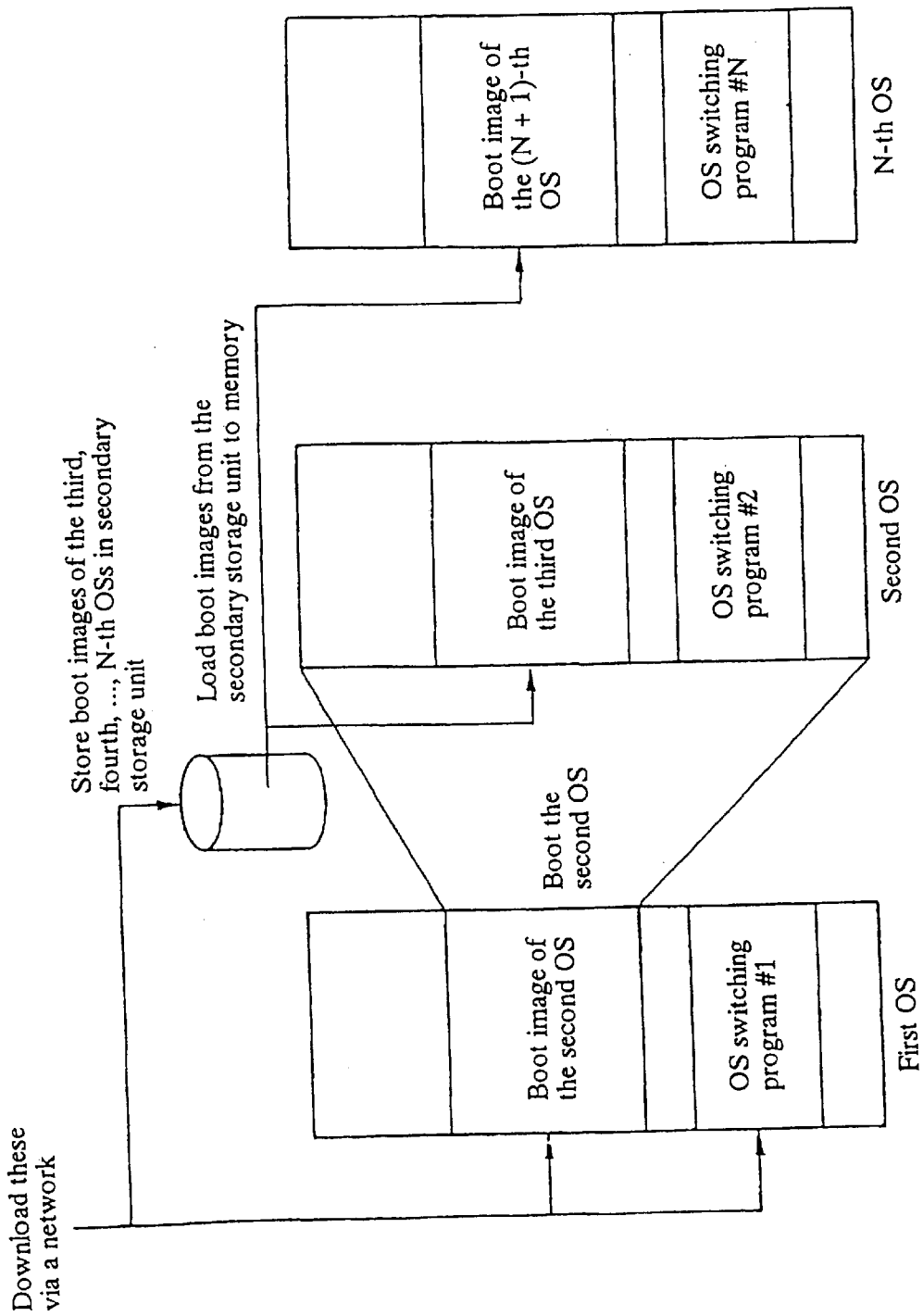
FIG. 12 includes image drawings showing another example of a method of downloading and booting boot images in the case of booting three or more kinds of OSs in turn.

In addition, a second method is a method applicable in such a case where an information memory area shared with a plurality of OSs can be secured. Thus, as shown in FIG. 12, the second method is a method of reading information, which is necessary for switching of an OS, from secondary storage unit by downloading the information, which is necessary for booting a plurality of OSs, which includes (N+1)-th and later OSs in a state of an N-th OS operating, in a lump, and storing the information in the secondary storage unit respectively (in addition, FIG. 12 shows a case of N=1). This second method has such an advantage that this method can also be applied in such a case where an OS (nevertheless, except the first OS) having no communication function for performing communication via a network is included among respective OSs to be booted in turn.

In addition, hereinbefore, such a case where the single application program (in detail, the boot image file of the second OS including only a single application program) is downloaded from among a plurality of application programs executable under the control of the second OS. Nevertheless, the present invention is not limited to this, but, for example, it can also be performed to make a user select an application, which is to be executed, from among the plurality of application programs, which are downloaded, in a state where the second OS is operating, after downloading all the plurality of application programs separately from the boot image file of the second OS, device drivers, and secondary storage unit I/O patch program.

Furthermore, hereinbefore, the verification of whether a user is valid is performed after download, the present invention is not limited to this. For example, if download is requested in such a mode of viewing a homepage and downloading necessary information, it can be performed to allow the user to download the information only if a server collates a password and an IP address and verifies that the user is valid. Moreover, in such a mode of viewing a homepage and downloading necessary information, if, for example, the download of an application updating a BIOS is requested, it can be performed to permit only a download request from a computer if a server verifies a model and production date, or BIOS version of the requester's computer and judges that the update of the BIOS is necessary.

Moreover, hereinbefore, a mode of downloading a program for embodying the present invention (the OS switching and booting program, device drivers, and secondary storage unit I/O patch program) via a network is described. Nevertheless, the present invention is not limited to this, but it can be performed to install programs into a computer from a storage medium (this corresponds to a storage medium according to the present invention) by recording all the programs, which are used for embodying the present invention, in the storage medium such as a floppy disk, or a CD-ROM. Owing to this, it becomes possible to apply a method for controlling a computer according to the present invention to the computer where the program is installed (it becomes possible to make the computer function as a computer according to the present invention).

In addition, hereinbefore, although a computer according to the present invention is exemplified with the notebook PC 12, the present invention is not limited to this, but it goes without saying that the computer can be a desktop PC or another type of computer. Furthermore, a second OS according to the present invention also is not limited to DOS, but it goes without saying that it is possible to adopt each of well-known OSs as the second OS.

As described above, the present invention acquires information, which is used for booting a second OS, which is different from a first OS operating on a computer, under the control of the first OS, writes the information, which is acquired, into the main storage unit of the computer, and makes the second OS with the information written into the main storage unit without deleting the information written into the main storage unit when detecting the termination of the first OS. Therefore, the present invention has such an excellent effect that the present invention is excellent in general versatility since it is possible to easily realize the switching of an OS to be booted on the computer, between OSs.

In addition, the present invention has another effect that a utilization range is wide since it is possible to easily switch an OS, which is booted, without modifying hardware and firmware of an existing computer.

What is claimed is:

1. A method for controlling a computer comprising the steps of:
    acquiring information used for booting a second operating system different from a first operating system under control of the first operating system in a state where the first operating system is operating on the computer;
    writing the acquired information into a main storage unit of the computer; and
    booting the second operating system on the computer with the information written into the main storage unit without deleting the information written into the main storage unit when termination of the first operating system is detected.

2. The method for controlling a computer according to claim 1 wherein the information for booting the second operating system is acquired by receiving the information as a file from outside of the computer via a communication line under control of the first operating system.

3. The method for controlling a computer according to claim 2 wherein the acquired information is once stored in a secondary storage unit of the computer.

4. The method for controlling a computer according to claim 1 wherein:
    the information for booting the second operating system is written beforehand in a secondary storage unit of the computer; and
    the information for booting the second operating system is acquired by reading the information from the secondary storage unit under control of the first operating system.

5. The method for controlling a computer according to claim 1 wherein:
    a boot image file of the second operating system is included in the information for booting the second operating system; and
    the second operating system is booted on the computer by writing the boot image file of the second operating system into the main storage unit of the computer and executing a bootstrap code of firmware accessing an area in the main storage unit where the boot image file of the second operating system is written after detecting termination of the first operating system.

6. The method for controlling a computer according to claim 5 wherein the boot image file of the second operating system is generated for a secondary storage unit.

7. The method for controlling a computer according to claim 5 wherein executing the bootstrap code of firmware accessing an area in the main storage unit where the boot image file of the second operating system is written is performed by hooking a secondary storage unit I/O service code.

8. The method for controlling a computer according to claim 1 wherein the information for booting the second operating system is once written in an area in the main storage unit which is not overwritten under control of the first operating system and thereafter a part or all of the information written is relocated to an area in the main storage unit which is not overwritten at least by booting the second operating system.

9. The method for controlling a computer according to claim 1 wherein at least one of a firmware update program, a program executing network boot requiring a specific protocol, a setup program, a program executing diagnosis of a computer system, and a program whose operation is not guaranteed in a state where the first operating system is operating or that executes processing unsuitable to execution in the state is run in a state where the second operating system is operating after the second operating system is booted on the computer.

10. The method for controlling a computer according to claim 1 wherein a series of processing from booting a first operating system on the computer to booting a second operating system on the computer is executed automatically and continuously executed.

11. The method for controlling a computer according to claim 1 wherein:
    information for booting two or more kinds of operating systems that are different from each other is acquired respectively as information for booting a second operating system that is different from the first operating system; and
    an operating system which is not booted yet among the two or more kinds of operating systems is booted on the computer each time termination of an operating system is detected.

12. The method for controlling a computer according to claim 1 wherein it is verified whether a computer user is an authorized user of a second operating system or whether the second operating system is a authorized operating system on a first operating system before or after acquiring information for booting the second operating system.

13. A computer comprising:
    acquisition logic for acquiring information used for booting a second operating system different from a first operating system under control of the first operating system in a state where the first operating system is operating on the computer;
    write logic for writing the information acquired by the acquisition logic into a main storage unit of the computer; and
    boot control logic for booting the second operating system on the computer with the information written into the main storage unit without deleting the information written into the main storage unit by the write logic when termination of the first operating system is detected.

14. A storage medium recording a computer executable program, the program comprising the steps of:
    acquiring information used for booting a second operating system different from a first operating system under control of the first operating system in a state where the first operating system is operating on the computer;
    writing the acquired information into a main storage unit of the computer; and
    booting the second operating system on the computer with the information written into the main storage unit without deleting the information written into the main storage unit when termination of the first operating system is detected.

15. The method for controlling a computer according to claim 1 wherein the acquired information is written into said main storage unit under control of the first operating system in a state where the first operating system is operating on the computer.

16. The computer according to claim 13 wherein the acquired information is written into said main storage unit under control of the first operating system in a state where the first operating system is operating on the computer.

17. The storage medium according to claim 14 wherein the acquired information is written into said main storage unit under control of the first operating system in a state where the first operating system is operating on the computer.

* * * * *